United States Patent
Ohki

(10) Patent No.: US 6,188,680 B1
(45) Date of Patent: Feb. 13, 2001

(54) RADIO ATM TRANSCEIVER

(75) Inventor: Masahiro Ohki, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 08/993,391

(22) Filed: Dec. 18, 1997

(30) Foreign Application Priority Data

Dec. 25, 1996 (JP) .................................................. 8-345891

(51) Int. Cl.[7] ............................ H04L 12/28; H04L 12/56
(52) U.S. Cl. ........................................... 370/338; 370/466
(58) Field of Search ................................... 370/338, 466, 370/467

(56) References Cited

U.S. PATENT DOCUMENTS 5,936,949 * 8/1999 Pasternak et al. ................... 370/328
6,009,096 * 8/1999 Jaisingh et al. ...................... 370/395

FOREIGN PATENT DOCUMENTS

| | | |
|---|---|---|
| 4-245742 | 9/1992 | (JP) . |
| 6-97955 | 4/1994 | (JP) . |
| 7-7491 | 1/1995 | (JP) . |
| 7-46248 | 2/1995 | (JP) . |
| 8-107417 | 4/1996 | (JP) . |

OTHER PUBLICATIONS

IEEE Journal on Selected Areas in Communications, vol. 12, No. 8, pp. 1401–1414.
Japanese Office Action issued May 26, 1999 in connection with a related application.
English–language translation of relevant portions of Japanese Office Action.

* cited by examiner

*Primary Examiner*—Melvin Marcelo
(74) *Attorney, Agent, or Firm*—Ostrolenk, Faber, Gerb & Soffen, LLP

(57) ABSTRACT

A radio ATM transceiver (where "ATM" stands for "Asynchronous Transfer Mode") is equipped in a radio base station and/or a radio terminal provided for a radio LAN, for example, to enable ATM-supported multimedia service, particularly to avoid occurrence of a burst of ATM cells in case of a CBR service. At a transmitting mode, the radio ATM transceiver receives SONET frame signals from an optical fiber, for example. The SONET frame signals are disassembled into ATM cells, from which signaling information is extracted and is subjected to analysis to recognize a service class which is requested for ATM communication. In accordance with the service class, a number of ATM cells are assembled together with an addition of a radio header to provide a radio packet. Then, the radio packets are transmitted into the air on the radio lines using a transmission speed which is employed for a radio modem. At a receiving mode, the radio ATM transceiver disassembles the radio packet transmitted thereto into a number of ATM cells with excluding the radio header. The ATM cells are converted to SONET frame signals, which are then outputted using a transmission speed which corresponds to the service class.

8 Claims, 4 Drawing Sheets

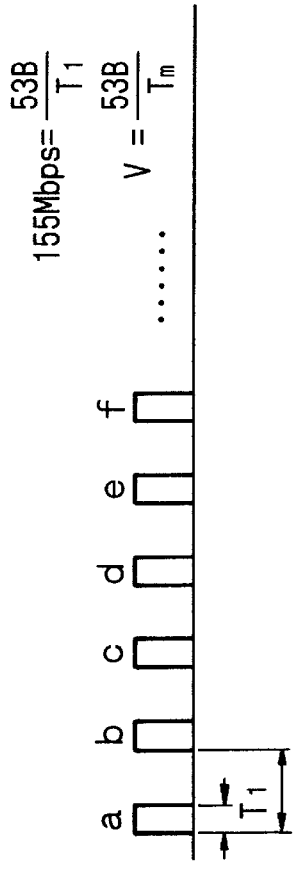
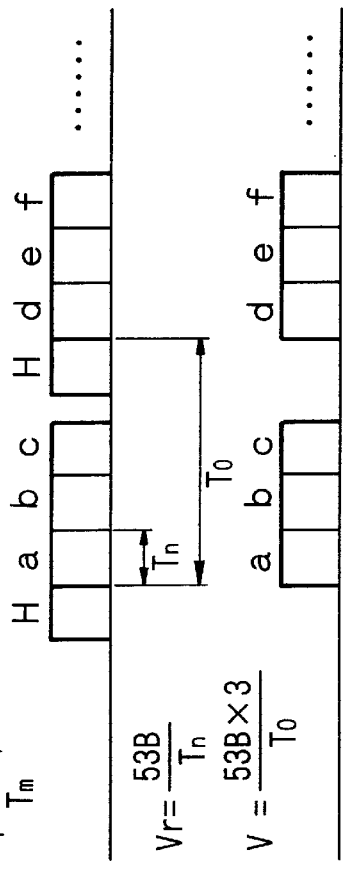
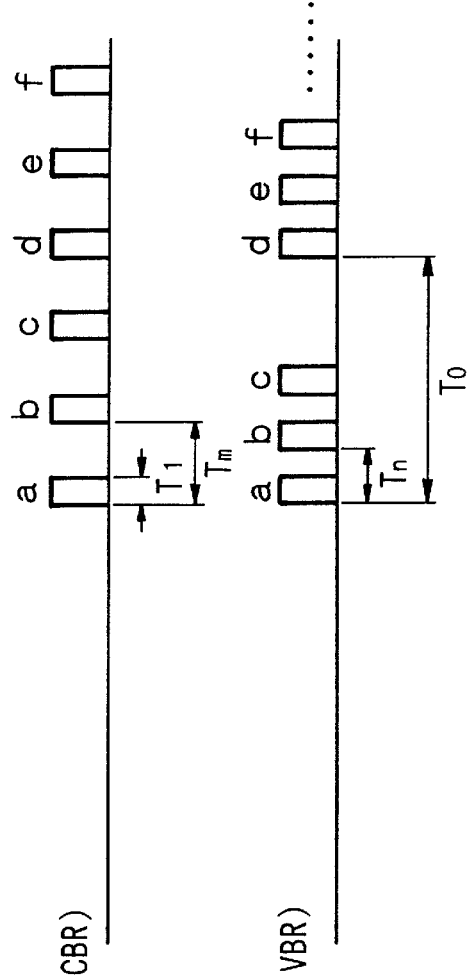
FIG.2A SIGNAL A (CBR)
FIG.2B SIGNAL B
FIG.2C SIGNAL C
FIG.2D SIGNAL D (CBR)
FIG.2E SIGNAL E (VBR)

RADIO ATM TRANSCEIVER

BACKGROUND OF THE INVENTION

1. Field of the Invention

This invention relates to radio ATM transceivers which receive and transmit ATM signals via radio lines in the air by means of ATM interfaces (where "ATM" is an abbreviation for "Asynchronous Transfer Mode"). Particularly, this invention provides a radio ATM transceiver which has a capability in ATM-supported multimedia services. This invention is based on patent application No. Hei 8-345891 filed in Japan, the content of which is incorporated herein by reference.

2. Prior Art

FIG. 5 shows a typical architecture of a radio ATM transceiver system which is conventionally known. Specifically, FIG. 5 shows an example of a radio LAN (an abbreviation for "Local Area Network") which provides a radio base station 100 and a number of radio terminals 201 to 20N.

The radio terminal 201 performs handshaking of data packets with a server 100 or other radio terminals 202 to 20N by means of the radio base station 100 which has an interface with a wired LAN 400. Such a data transmission using the conventional radio LAN is, like the Ethernet, a so-called best-effort type transmission which cannot perform transmission of data immediately. For this reason, the above data transmission is not suited to transmission of information such as image signals which require real-time performance.

Both of the radio LAN and Ethernet are based on the MAC collison control method (where "MAC" is an abbreviation for "Media Access Control"). For this reason, there is a possibility that packets from terminals cannot be transported within a certain time when as the terminals issue transmission requests simultaneously. So, the conventional radio data communications method is limited to handling data of non-real-time performance such as characters and image files.

Meanwhile, the ATM system has been introduced as the key technology to realize the B-ISDN (an abbreviation of "Broadband Integrated Services Digital Network"). This ATM system is capable of handling so-called multimedia information such as voice, data and pictures (e.g., image signals) efficiently. Because, in the ATM system, the network guarantees the quality of service which the terminal requires in response to a request of service from the terminal.

Specifically, the ATM system is of the connection-oriented type. So, when starting transmission, the terminal requests a certain quality of service against the ATM switch by a signaling mode. Then, the ATM switch communicates with another ATM switch within the communication network to confirm whether to secure a bandwidth necessary to accomplish the requested service. If it is confirmed that the bandwidth can be secured, the ATM system establishes the connection to provide the service for the terminal. Thanks to the above operation, the ATM system is capable of providing a variety of services such as the following CBR (an abbreviation of "Constant Bit Rate"), VBR (an abbreviation of "Variable Bit Rate") and ABR (an abbreviation of "Available Bit Rate").

In case of transmission of image signals which requires real-time performance, the ATM system supports transmission by CBR or VBR. In contrast, in case of transmission of character data which does not require real-time performance, the ATM system supports transmission by ABR. Incidentally, the ABR is the best-effort type service which performs transportation of data only when vacancy exists in the resource within the network.

To enable communications of multimedia signals such as the image signals even in the areas of radio communications by using the aforementioned advantages of the ATM system, the ATM forum and ETSI (an abbreviation of "European Telecommunications Standards Institute") recently began setting standards for the radio ATM systems.

The conventional radio ATM transceiver has a relatively slow radio transmission speed which is smaller than 155 Mbps for ATM by one digit. For this reason, the conventional technology should perform transmission by assembling multiple ATM cells. As a result, the ATM cells are in burst conditions. So, the conventional technology suffers from the following problems at the side of the clients.

That is, there is a probability to cause deterioration of the quality of service due to the fluctuations of intervals of the cells. In addition, there is a probability to cause the lack of the processing ability due to the reduction of intervals of the cells.

Next, the above problems will be explained in a concrete manner with reference to FIGS. 2A to 2E and FIG. 3.

FIG. 3 shows an example of a system which establishes connections between a VOD server 10 and a VOD client 20 by means of an ATM switch (abbreviated by "ATMSW") 30, where "VOD" is an abbreviation for "Video On Demand". A connection is established between the VOD client 20 and ATM switch 30 via a radio line (or radio transmission path) in the air between radio modems 40 and 50 (where "modem" is an abbreviation for "modulator-demodulator"). Using the above connection, the system performs data transmission. Herein, ATM cells are transported, using the CBR which is normally used for the VOD service, with a transmission speed V (bps) which is required to provide the VOD service.

In the ATM system, the ATM cell has a basic unit whose length is short, i.e., 53 bytes. The radio modem 40 receives ATM cells from the VOD server 10 via the ATM switch 30, so that the radio modem 40 transmits the ATM cells to the radio modem 50 one-by-one in a transparent manner see signal A in FIG. 2A. Due to the transmission capability of the radio modem and the overhead corresponding to an addition of the radio header, there is a probability that the transmission speed V cannot be guaranteed.

To avoid the above problems, the system uses a form of a signal B shown in FIG. 2B, for example. That is, the system transmits multiple ATM cells assembled together. However, when the ATM cells in the signal B are directly passed to the VOD client 20, the ATM cells should be arranged like a signal E of FIG. 2E which corresponds to the VBR of the burst type. In that case, it is not possible to meet the condition of the CBR.

As a result, the conventional system has a probability to cause the deterioration of the quality of service due to the fluctuations of the intervals of the cells as well as a probability to cause the lack of the processing capability due to the reduction of the intervals of the cells. SUMMARY OF THE INVENTION It is accordingly an object of the invention to provide a radio ATM transceiver which is capable of providing the multimedia service supported by the ATM using transmission paths corresponding to radio lines in the air.

It is another object of the invention to avoid occurrence of the burst-type ATM cells in the CBR service.

It is a further object of the invention to avoid deterioration of the quality of service due to the fluctuations of the intervals of the cells as well as lack of the processing capability due to the reduction of the intervals of the cells.

A radio ATM transceiver of this invention operates in connection with a transmitting mode and a receiving mode independently. In the transmitting mode, the radio ATM transceiver receives SONET frame signals via an optical fiber, for example. Herein, the SONET frame signals are disassembled into ATM cells, from which signaling information is extracted and is subjected to analysis to recognize a service class (e.g., a CBR service) which is requested for ATM communication. In accordance with the service class, a number of ATM cells are assembled together with an addition of a radio header to provide a radio packet. Then, radio packets are forwarded to a radio modem, from which they are transmitted into the air on radio lines using a prescribed transmission speed. It the receiving mode, the radio ATM transceiver disassembles the radio packet transmitted thereto into a number of ATM cells with excluding the radio header. The ATM cells are converted to SONET frame signals, which are then outputted using a transmission speed which corresponds to the service class.

BRIEF DESCRIPTION OF THE DRAWINGS

These and other objects of the subject invention will become more fully apparent as the following description is read in light of the attached drawings wherein:

FIGS. 2A, 2B, 2C, 2D and 2E are time charts showing signals for transporting ATM cells used at selected points of the block diagram of FIG. 1;

DESCRIPTION OF THE PREFERRED EMBODIMENT

Figure 1:
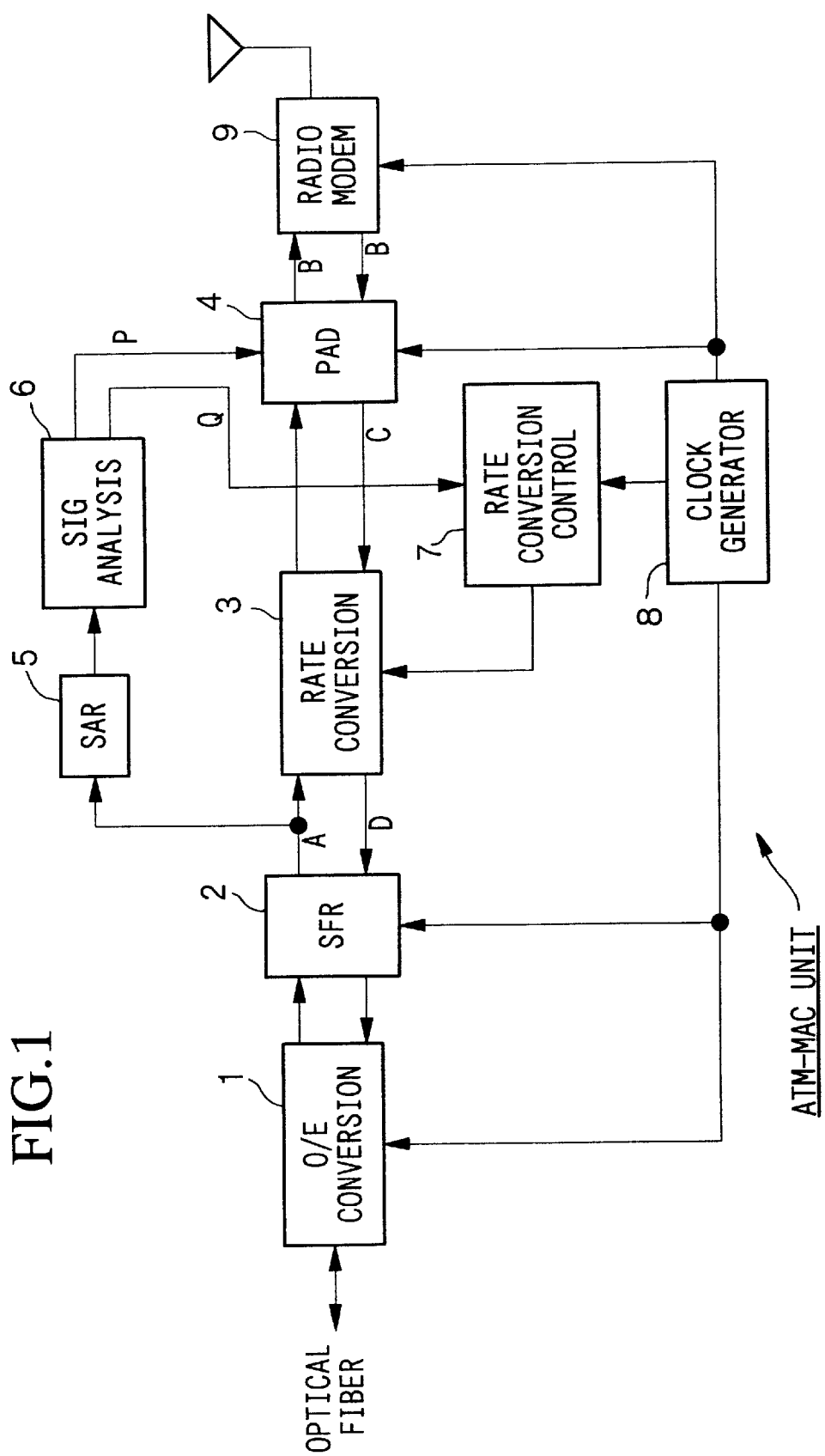
FIG. 1 is a block diagram showing a configuration of a radio ATM transceiver in accordance with an embodiment of the invention.

FIG. 1 is a block diagram showing a configuration of a radio ATM transceiver in accordance with an embodiment of the invention.

Figure 3:
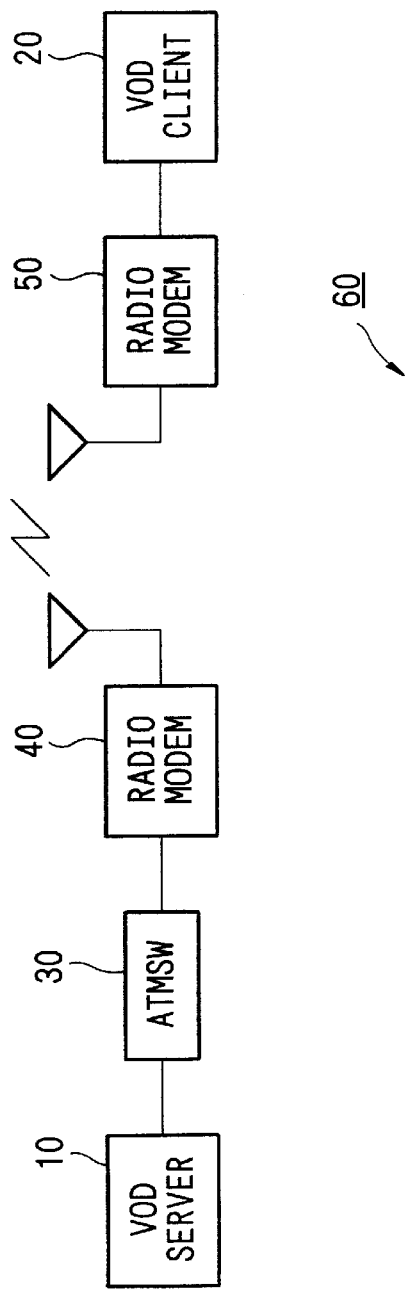
FIG. 3 is a block diagram showing an example of a radio ATM transceiver system established between the server and client.

FIG. 1 shows selected parts of the radio ATM transceiver, i.e., a radio modem 9 and an ATM-MAC unit (i.e., ATM media access control unit) which contains blocks 1 to 8. The ATM-MAC unit is located between the radio modem 40 and the ATM switch 30 shown in FIG. 3 or between the radio modem 50 and the VOD client 20 of the multimedia terminal. So, the ATM-MAC unit interfaces with the SONET (an abbreviation of "Synchronous Optical Network") via the ATM switch or via the multimedia terminal and optical fiber.

Specifically, the ATM-MAC unit is configured by an O/E conversion block 1 (where "O/E" stands for "Opto-Electronic"), a SONET framer block 2 (abbreviated by "SFR"), a rate conversion block 3, a PAD block 4 (where "PAD" stands for "Packet Assembly/Disassembly"), a SAR block 5 (where "SAR" stands for "Segmentation and Reassembly"), a signaling analysis block 6 (abbreviated by "SIG analysis"), a rate conversion control block 7 and a clock generator 8.

FIGS. 2A to 2D are time charts showing relationships between signals A to D used in the ATM-MAC unit of FIG. 1. The blocks of the ATM-MAC unit are provided between the optical fiber (corresponding to the ATM interface) and radio communication. Specifically, "A" denotes an output signal of the SFR 2 to be forwarded for the radio communication; "B" denotes input/output signals of the PAD 4 for the radio communication; "C" denotes an output signal of the PAD 4 to be forwarded for the ATM interface; and "D" denotes an input signal of the SFR 2 from the radio communication. Incidentally, the signals A and D are suited to the aforementioned CBR service of the SONET.

Next, operation will be described with respect to each of the blocks of FIG. 1 in conjunction with FIGS. 2A to 2D and FIG. 3.

The O/E conversion block 1 receives SONET frame signals from the ATM switch or multimedia terminal (i.e., client) via the optical fiber. So, the O/E conversion block 1 converts the SONET frame signals to electric signals, which are then forwarded to the SFR 2. In addition, the O/E conversion block 1 converts electric signals given from the SFR 2 to SONET frame signals.

The SFR 2 receives the electric signals of the O/E conversion block 1 which correspond to the SONET frame signals. The SFR 2 disassembles the electric signals to ATM cells which are provided in the form of the signal A. The signal A is delivered to the rate conversion block 3 and the SAR 5. In addition, the SFR 2 converts the signal D, output from the rate conversion block 3, to electric signals which are suited to the aforementioned SONET frame signals. Thus, the electric signals are forwarded to the OIE conversion block 1.

Under control of the rate conversion control block 7, the rate conversion block 3 converts the transmission speed (e.g., bit rate) of the signal A containing the ATM cells to coincide with the transmission speed of the radio line. Then, the signal A output from the rate conversion block 3 is forwarded to the PAD 4. In addition, the signal C output from the PAD 4 is supplied to the rate conversion block 3 wherein the transmission speed of the ATM cell thereof is converted to match with the CBR which is suited the SONET frame signal. Thus, the rate conversion block 3 produces the signal D, based on the signal C, which is then forwarded to the SFR 2.

The PAD 4 receives the ATM cells output from the rate conversion block 3. So, the PAD 4 assembles a certain number of ATM cells together on the basis of a transmission speed designating signal P output from the SIG analysis block 6. Then, the PAD 4 adds a radio header to the ATM cells, which are then assembled in accordance with the format suited to the transmission of the radio lines. Thus, the PAD 4 forms radio packets, which are provided in the form of the signal B. The signal B is subjected to radio communication by the radio modem 9. In addition, the radio modem 9 converts an incoming radio signal to the signal B, which is input to the PAD 4. The PAD 4 removes the radio header from the radio packet, which is then disassembled into a certain number of ATM cells. So, the PAD 4 produces the signal C corresponding to the disassembled ATM cells, so the signal C is forwarded to the rate conversion block 3.

The SAR 5 receives the signal A formed by ATM cells from the SFR 2. Herein, the SAR 5 extracts signaling information from the ATM cell to transfer it to the SIG analysis block 6. The signaling information is transmitted between the ATM switch and multimedia terminal and is contained in a prescribed area of the ATM cell.

The SIG analysis block 6 stores a transmission speed of the radio line in advance. In addition, the SIG analysis block 6 recognizes a parameter corresponding to a service class in response to the signaling information given from the SAR 5. Based on the transmission speed of the radio line and signaling information, the SIG analysis block 6 provides a transmission speed designating signal P, which is supplied to the PAD 4 to designate a number of ATM cells to be assembled together into one packet. Based on the parameter, the SIG analysis block 6 provides a control signal Q, which is supplied to the rate conversion control block 7 to set a prescribed clock frequency.

The rate conversion control block 7 receives a reference clock signal generated by the clock generator 8 of the radio ATM transceiver. Based on the control signal Q given from the SIG analysis block 6, the rate conversion control block 7 sets the prescribed clock frequency to the reference clock signal. Thus, the reference clock signal having the prescribed clock frequency is supplied to the rate conversion block 3.

Next, a description will be given with respect to transportation of the ATM cells in the radio ATM transceiver in conjunction with FIG. 1 and FIGS. 2A to 2E.

Incidentally, the description of the transportation of the ATM cells will be described with respect to the situation where the radio ATM transceiver of FIG. 1 is located at both ends (i.e., transmitting side and receiving side) of the radio line established between the ATM switch and multimedia terminal wherein the CBR service is provided by the SONET between the ATM switch and multimedia terminal.

At the transmitting side, the radio ATM transceiver inputs signals from an optical fiber. Herein, the input signals are based on the CBR service for the SONET frame signals. So, a number of ATM cells a, b, c, . . . are arranged at equal intervals on the signal A output from the SFR 2 (see FIG. 2A). Because one cell consists of 53 B (byte), a transmission speed V of CBR against a cell period Tm is calculated by a mathematical equation (1) as follows:

$$V = 53\ B\ /Tm\text{(bps)} \tag{1}$$

The ATM cells are input to the rate conversion block 3 wherein they are subjected to speed adjustment with a transmission speed Vr which is processed by the radio modem 9.

Then, the ATM cells whose transmission speed is adjusted are input to the PAD 4. Herein, a prescribed number of the ATM cells are assembled together in accordance with the transmission speed designating signal P given from the SIG analysis block 6. In this case, three cells are each assembled together and is subjected to formatting (see FIG. 2B). That is, the ATM cells a, b and c are assembled together while the ATM cells d, e and f are assembled together. Then, a radio header H is added to each combination of the formatted three ATM cells to form a prescribed radio packet. The radio packets are arranged in the form of the signal B. Thereafter, the radio modem 9 performs modulation on the signal B and transmits it in the air on the radio line.

It is possible to represent relationships among the transmission speed Vr (bps) of the radio modem 9 and the aforementioned transmission speed V of the CBR as well as an ATM cell length Tn and a period To of the radio packet corresponding to the formatted three ATM cells by mathematical equations as follows:

$$Vr = 53\ B/Tn,\quad V = 53\ B \times 3/To \tag{2}$$

At the receiving side, the radio ATM transceiver receives radio packets transmitted thereto. The radio modem 9 of the radio ATM transceiver decodes the radio packets to reproduce the signal B. Then, the PAD 4 removes the radio header from the signal B to provide the signal C, which is forwarded to the rate conversion block 3.

As shown in FIG. 2C, a time series of ATM cells of the signal C are not arranged in an equal-interval manner but in a burst manner. For this reason, if the rate conversion block 3 directly forwards the signal C to the SFR 2 while converting its rate, an output of the radio ATM transceiver should be subjected to burst transmission onto the optical fiber like the signal E shown in FIG. 2E.

To avoid the above burst transmission, it is necessary to convert the signal C to the signal D corresponding to the CBR time series. In order to do so, the SIG analysis block 6 supplies the control signal Q to the rate conversion control block 7 to produce a prescribed frequency of 1I/V (Hz).

The rate conversion block 3 contains a FIFO memory based on the first-in-first-out system. So, the rate conversion block 3 writes the ATM cells, output from the PAD 4, into the FIFO memory thereof in accordance with a clock frequency of 1/Vr (Hz) of the radio modem 9. Then, the rate conversion block 3 performs reading operation on the FIFO memory in accordance with the prescribed frequency of 1/V (Hz) produced by the rate conversion control block 7. Thus, it is possible to read the signal D from the FIFO memory. The signal D is forwarded to the SFR 2.

As shown in FIG. 2D, the signal D consists of the ATM cells of CBR having cell intervals Tm.

The SFR 2 inserts a vacant cell into a gap between the ATM cells by a speed of 155 Mbps so as to provide an output signal thereof. Then, the output signal of the SFR 2 is subjected to opto-electronic conversion of the O/E conversion block 1, an output of which is then transmitted onto the optical fiber.

According to the present embodiment described heretofore, the processing of the radio ATM transceiver can be summarized as follows:

In the radio (or wireless) interval of distance, radio transmission is performed with respect to the ATM cells corresponding to the radio packets whose format is suited to the transmission capability of the radio modem. At the side of the ATM switch or multimedia terminal, the data are subjected to handshaking in accordance with the service class which is negotiated by the signaling.

Based on the signaling information given from the SAR 5, the SIG analysis block 6 recognizes the parameter corresponding to the service class. In case of the CBR, for example, the SIG analysis block 6 recognizes the peak cell rate or cell delay variation tolerance as the parameter.

Incidentally, the signaling which is subjected to handshaking between the ATM switch and multimedia terminal is made based on the protocol of the regulation Q2931 of the ITU-T (i.e., International Telecommunication Union—Telecommunication Sector).

Figure 4:
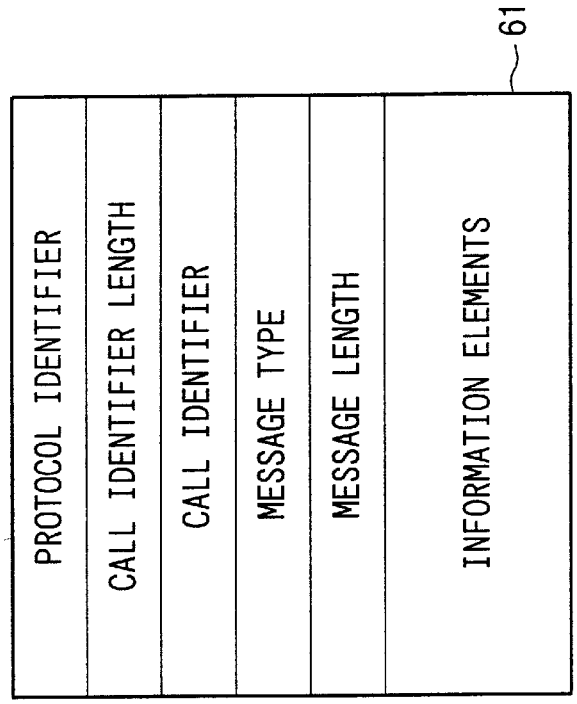
FIG. 4 is an information arrangement diagram showing an example of a protocol format for signaling on the basis of the ITU-T regulation.
Figure 5:
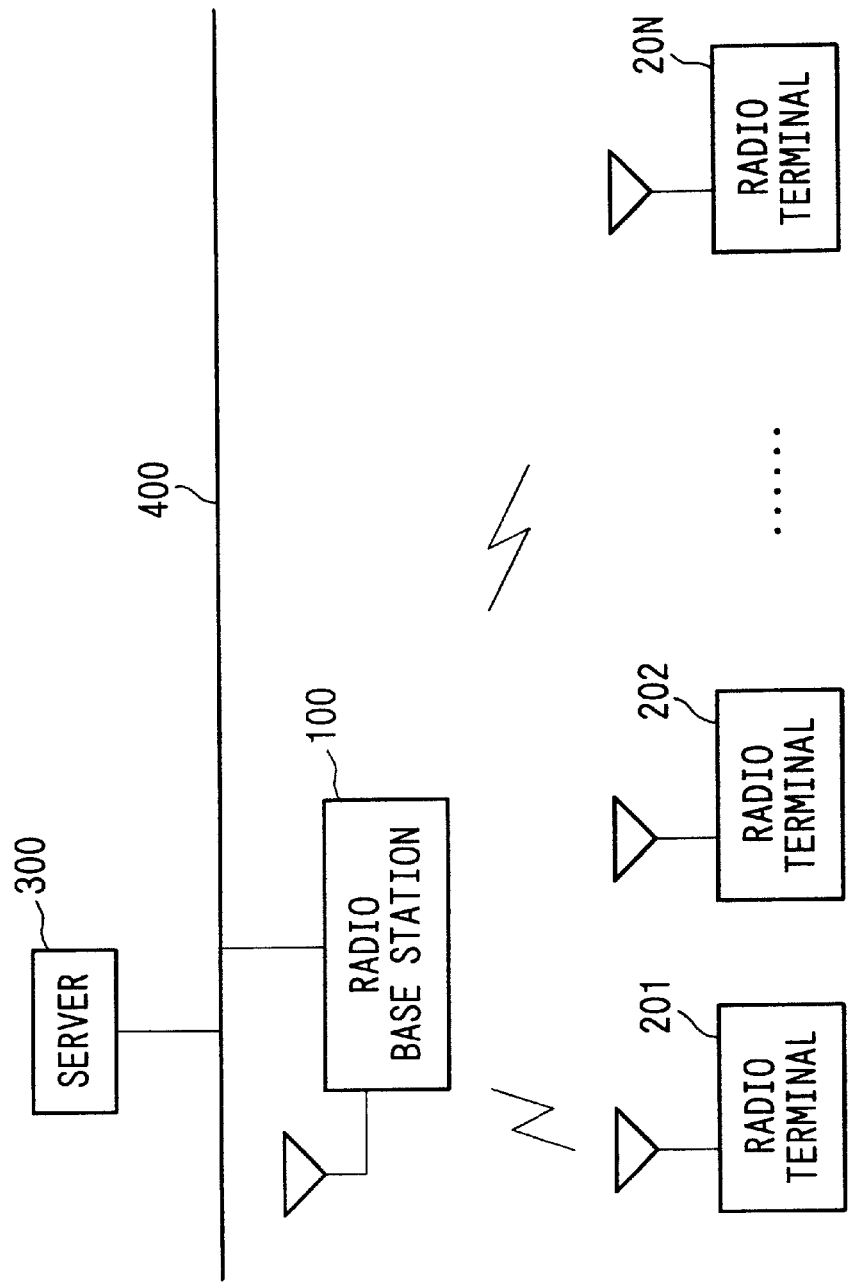
FIG. 5 is a block diagram showing a typical architecture of a radio ATM transceiver system which is conventionally known.

FIG. 4 is an information arrangement diagram showing a content of a protocol format 60 used by the aforementioned signaling. The protocol format 60 contains a protocol identifier, a call identifier length, a call identifier, a message type, a message length and information elements 61. The service class of the aforementioned CBR or VBR is declared in the information elements 61.

In the configuration of the radio ATM transceiver of FIG. 1, the SIG analysis block 6 reads the information elements 61 of the protocol format 60 so as to recognize the service class which is requested.

Incidentally, the present embodiment is explained using the CBR as for the parameter corresponding to the service class. Of course, it is possible to use other parameters or other services. Because, the radio ATM transceiver of this invention is designed to read the signaling information from the ATM cells input thereto.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A radio ATM transceiver which transmits ATM signals given via an ATM interface onto a radio line, comprising:

SONET framer means for disassembling electric signals, which are supplied thereto from an optical fiber via the ATM interface, into ATM cells, said SONET framer means also converting ATM cells, which are supplied thereto, into electric signals;

signaling analysis means for analyzing signaling information from the ATM cells so as to provide a number of the ATM cells which are assembled together for transmission onto the radio line as well as a bit rate employed for the ATM interface;

rate conversion means for converting a transmission speed of incoming signals thereof to coincide with a first transmission speed corresponding to a time series of ATM cells of the SONET framer means or a second transmission speed corresponding to a bit rate employed for the radio line on the basis of an output of the signaling analysis means; and packet assembly/disassembly means for assembling a number of the ATM cells, given from the rate conversion means, with an addition of header information to form a radio packet, which is then transmitted onto the radio line, said packet assembly/disassembly means also disassembling the radio packet, given from the radio line, with excluding header information into ATM cells, which are then supplied to the rate conversion means.

2. A radio ATM transceiver comprising:

a radio modem for receiving and transmitting radio packets each corresponding to a number of ATM cells and a radio header; and an ATM media access control unit for at a transmitting mode, producing the radio packets based on incoming SONET frame signals thereof to have a transmission speed employed for the radio modem, whereas at a receiving mode, the ATM media access control unit reproduces the ATM cells from the radio packets to provide SONET frame signals having a transmission speed which corresponds to a service class designated by signaling information contained in the ATM cells.

3. A radio ATM transceiver as defined in claim 2 wherein the service class corresponds to a CBR service (where "CBR" stand for "Constant Bit Rate").

4. A radio ATM transceiver comprising:

a radio modem for receiving and transmitting a radio packet;

conversion means for performing mutual conversion between SONET frame signals and ATM cells;

analysis means for analyzing signaling information extracted from the ATM cells to recognize a service class which is requested for ATM communication;

speed control means for controlling a transmission speed of incoming signals thereof to coincide with a first transmission speed employed for the radio modem or a second transmission speed corresponding to the service class; and packet assembly/disassembly means for at a transmitting mode, assembling a number of ATM cells with an addition of a radio header to provide the radio packet which is forwarded to the radio modem, whereas at a receiving mode, said packet assembly/disassembly means disassembles the radio packet into the number of ATM cells which are forwarded to the speed control means.

5. A radio ATM transceiver as defined in claim 4 wherein the service class corresponds to a CBR service (where "CBR" stands for "Constant Bit Rate").

6. A radio ATM transceiver which transmits ATM signals given via an ATM interface onto a radio line, comprising:

a SONET framer which disassembles electric signals, which are supplied thereto from an optical fiber via the ATM interface, into ATM cells, said SONET framer also converting ATM cells, which are supplied thereto, into electric signals;

a signaling analyzer which analyzes signaling information from the ATM cells so as to provide a number of the ATM cells which are assembled together for transmission onto the radio line as well as a bit rate employed for the ATM interface;

a rate converter which converts a transmission speed of incoming signals thereof to coincide with a first transmission speed corresponding to a time series of ATM cells of the SONET framer of a second transmission speed corresponding to a bit rate employed for the radio line on the basis of an output of the signaling analyzer; and a packet assembler/dissassembler which assembles a number of the ATM cells, given from the rate converter, with an addition of header information to form a radio packet, which is then transmitted onto the radio line, said packet assembler/disassembler also disassembling the radio packet, given from the radio line, with excluding header information into ATM cells, which are then supplied to the rate converter.

7. A radio ATM transceiver comprising:

a radio modem for receiving and transmitting a radio packet;

a converter which performs mutual conversion between SONET frame signals and ATM cells;

an analyzer which analyzes signaling information extracted from the ATM cells to recognize a service class which is requested for ATM communication;

a speed controller which controls a transmission speed of incoming signals thereof to coincide with a first transmission speed employed for the radio modem or a second transmission speed corresponding to the service class; and a packet assembler/disassembler which, at a transmitting mode, assembles a number of ATM cells with an addition of a radio header to provide the radio packet which is forwarded to the radio modem, whereas at a receiving mode, said packet assembler/disassembler disassembles the radio packet into the number of ATM cells which are fonvarded to the speed controller.

8. A radio ATM transceiver as defined in claim 7, wherein the service class corresponds to a CBR service (where "CBR" stands for "Constant Bit Rate").

* * * * *